United States Patent [19]
Mickelson

[11] 4,342,134
[45] Aug. 3, 1982

[54] CASTER ASSEMBLY

[76] Inventor: Dale Mickelson, 829 Zurich Dr., Lake Arrowhead, Calif. 92317

[21] Appl. No.: 48,995

[22] Filed: Jun. 15, 1979

[51] Int. Cl.³ .............................................. B60B 33/00
[52] U.S. Cl. .................................................... 16/31 R
[58] Field of Search .................. 16/31 R, 31 A, 18 R, 16/47

[56] References Cited
U.S. PATENT DOCUMENTS

| | | | |
|---|---|---|---|
| 698,963 | 4/1902 | Kennedy | 16/47 |
| 3,433,500 | 3/1969 | Christensen | 16/47 |

*Primary Examiner*—Doris L. Troutman
*Attorney, Agent, or Firm*—Erik M. Arnhem

[57] ABSTRACT

A caster assembly comprising caster wheels, a saddle, mounted pivotally on the wheel axis, having a bore in its upper surface which extends therein offset from and perpendicularly to the wheel axis, a first stem, one end of which is mounted in the saddle bore, the other end of the stem extends vertically upward therefrom; a horizontally extending slab is mounted pivotally on the free end of the first stem; a second stem is mounted pivotally, offset from the first stem and the wheel axis, in the slab and extends upwardly therefrom; the free end of the second stem is mountable in the underside of a rollable object.

3 Claims, 4 Drawing Figures

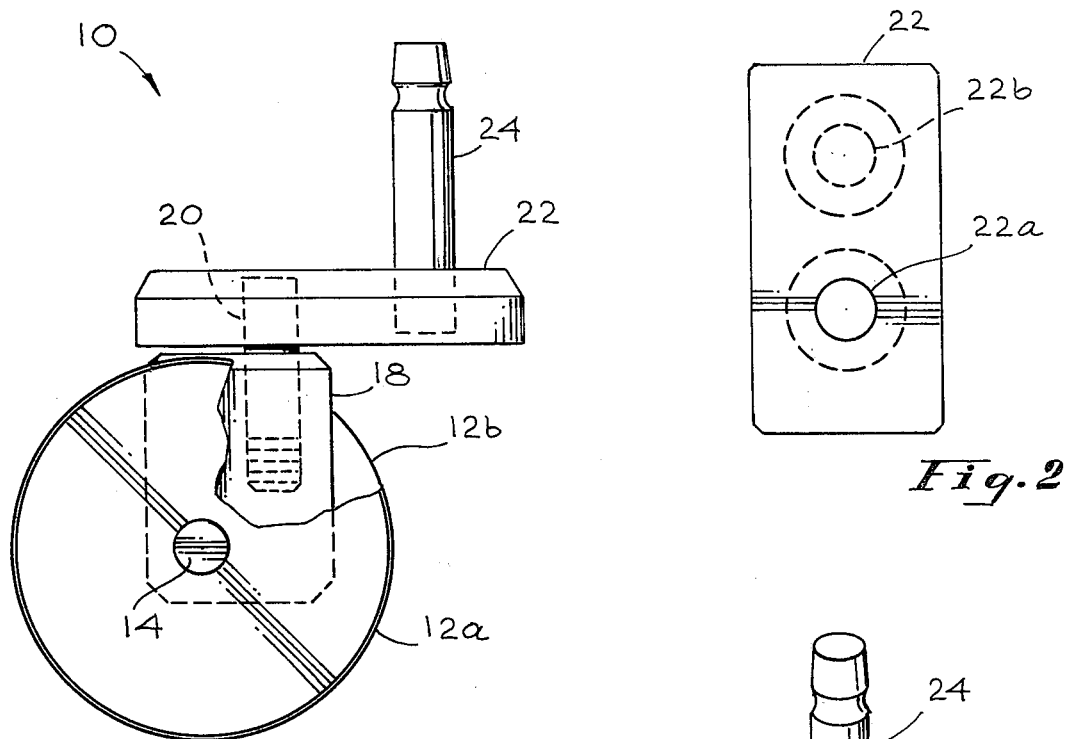
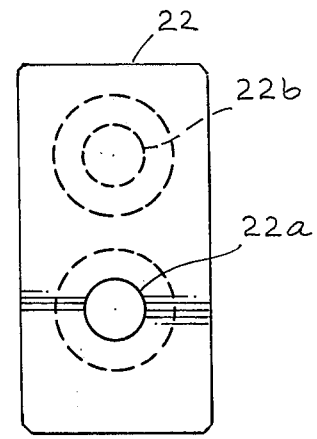
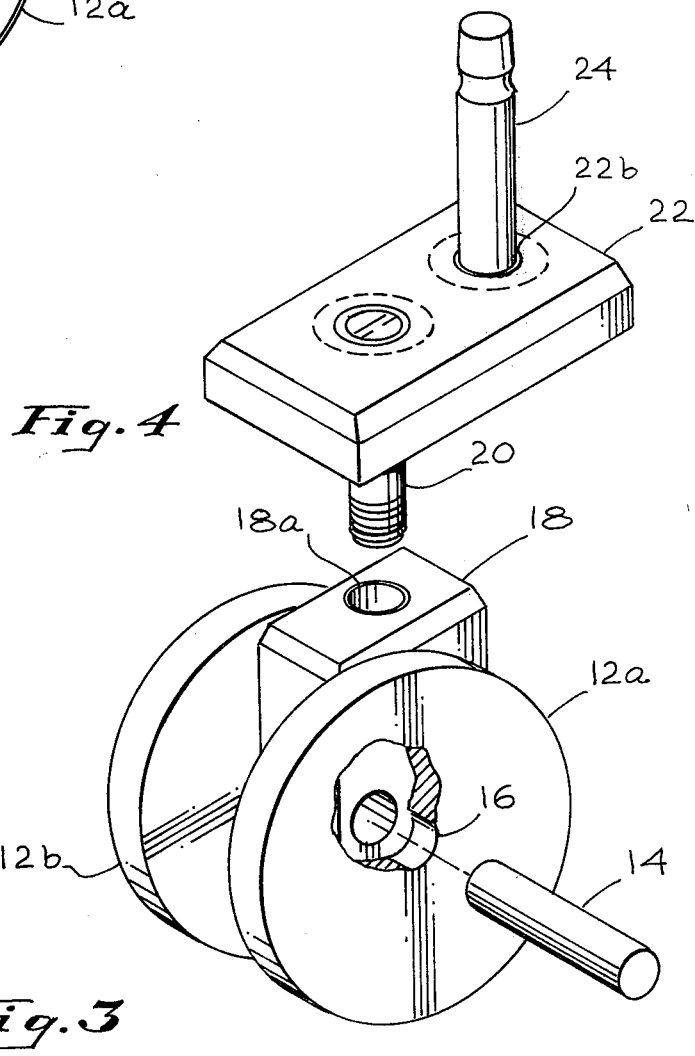

CASTER ASSEMBLY

BACKGROUND OF THE INVENTION (1) Field of the Invention

My invention relates to improvements in casters, primarily for wheeling of furniture, classified under class 16, subclass 18.

More specifically the present invention concerns a unique construction of casters, having a dual level of vertical swivels, interconnected by an intermediate member, and mutually offset from one another and from the horizontal axis of the caster wheels.

The advantages of this unique construction will appear more clearly in the following detailed description. Among other things the invented improvement in casters will permit rapidity of reorientation and rolling of, e.g., any piece of furniture, on which the invented casters are mounted, to a degree that was heretofore not attainable.

(2) Description of the Prior Art

The following U.S. patents were developed, none of which appears to be pertinent to applicant's caster construction:

| U.S. Pat. | | |
| --- | --- | --- |
| #474 576 | CUTTER | (1892) |
| #498 297 | PEDERSON | (1892) |
| #3 869 105 | DANIELS | (1975) |

SUMMARY OF THE INVENTION

In addition to what is stated under (c) and (e) above, the present invention refers to a construction of casters, having a dual level of vertical swivels, which (when attached-e.g., to furniture legs) will substantially eliminate the initial heavy rotary movements of caster wheels inherent in existing caster constructions.

The advantages of providing a caster with a two layer system of mutually offset vertical swiveling elements are many. The most obvious ones are set forth in the following:

(a) The dual offset swivel system of the invention will greatly reduce efforts to initiate the rolling movements, e.g., a chair from a standing start, with a resultant effortless reorientation to its next position, that is to say carrying out tracking while movement is under way.

(b) In attaining guide orientation, one will also substantially do away with resistance to any catching engagement of the caster wheels with deep or soft floor coverings. Thus, present caster construction will eliminate or lessen wear or damage to carpeting.

(c) The caster assembly, according to the invention, will speed up the tracking reorientation to the following position of the caster wheels.

(d) The erratic movements about single vertical axis of the conventional type caster with scraping action against carpeting when reorientating the caster is totally eliminated, by virtue of the invented caster assembly.

Thus, it is an object of the invention to provide a caster which facilitates the movements of rollable objects from standing positions, for easy reorientation into other positions.

It is a further object of the invention to provide a caster, which will reduce the wear and tear of soft floor coverings, over which it rolls.

It is still a further object of the invention to provide a caster, which, while simple and inexpensive to manufacture, will be of sturdy construction, giving years of reliable service.

BRIEF DESCRIPTION OF THE DRAWINGS

FIG. 1 is an elevational partly interior view of the caster assembly, the opposite side being a mirror image thereof.

FIG. 2 is a top view of an intermediate member rotatably connected to two vertical swivels.

FIG. 3 is a perspective exploded view of the caster assembly.

FIG. 4 is a perspective view of the intermediate member of FIG. 2, with two vertical swivels mounted therein.

DESCRIPTION OF THE PREFERRED EMBODIMENT

In the drawings like reference characters designate similar parts in the several views.

Referring now in detail to the drawings, numeral 10 of FIG. 1 designates the caster assembly in its entirety.

Floor engaging means, e.g., a pair of wheels 12a and 12b are interconnected by means of axis 14, the ends of which are mounted rigidly, by any appropriate means, in central holes 16, respectively, of wheels 12. The wheels 12, preferably constitute solid disks, made of metal or sturdy plastic.

A supporting member, e.g., saddle 18, is threaded on and turns freely about axis 14, between wheels 12.

The saddle 18 may, preferably consist of a polygonally shaped solid block made of metal, or sturdy plastic material.

When caster assembly 10 is mounted, e.g., to a leg of a chair and rests on the floor, the top surface portion of saddle 18 is provided with a bore 18a (preferably 1¼" deep), the lower part of which (indicated by broken lines in FIG. 1) is internally threaded to receive and retain a vertically extending and pivotally connecting means, e.g., first stem 20 correspondingly being externally threaded at its lower end.

An intermediate member, e.g., a horizontally disposed slab 22 is provided, at one of its ends (FIG. 2) with a first vertically extending bore 22a, in which the other end of stem 20 is mounted for pivotal connection with slab 22. The slab 22 preferably consists of a substantially rectangular solid piece of metal or sturdy plastic material.

Thus, the upper portion of stem 20 is carrying slab 22.

The pivotal connection (not shown) between stem 20 and slab 22 may be established in that stem 20 runs in a bearing, for example, a conventional ball bearing with an inner and outer race, the inner race being fixed to the upper part of stem 20.

One could also provide the upper portion of stem 20 with an annular groove, in which is disposed a resilient protruding split ring. The bore 22a in slab 22 (into which stem 20 is received) then would have a corresponding groove into which, on insertion, the initially compressed split ring will be forced, for subsequent expansion and holding of stem 20 and slab 22 in pivotal but firm assembly.

The above indicated alternatives are not illustrated in the drawings, or described in great details, as being part of well established prior art for pivotal connections.

A second bore 22b is disposed in slab 22 at the end opposite that of bore 22a, and receives a second pivotal means, e.g., a second stem 24, extending vertically upward from slab 22. The pivotal connection (not shown) between second stem 24 and slab 22 may likewise be constituted by a ball bearing or a resilient deformable split ring, to pivotally accommodate the stem and slab, as explained above.

The upper portion of second stem 24 is provided with a circumferential groove, within which a resilient split ring may also be mounted to be received by a socket or bore, e.g., in a chair leg (not shown), the latter being provided with a corresponding groove for engagement with the split ring and pivotal connection therewith.

Obviously, stem 24 could be mounted in a chair leg (or any object to be rolled) by any other appropriate means.

One could, obviously substitute a caster assembly having one single wheel for the above described two-wheel caster construction in which case saddle 18 should be modified to a forked member, within which a single wheel is rotating on an axis extending within the bifurcating portion of the modified saddle.

The gist of the invention is that the present caster assembly is furnished with a dual level vertical swivel system disposed mutually offset from one another and from the wheel axis.

As noted above many practical advantages are derived from this unique caster construction, in particular that some swiveling motions may be carried out by, e.g., a piece of furniture without initially actuating the caster wheel axis, thus facilitating subsequent reorientation of the wheels to new positions of the furniture piece; this will also prevent unnecessary scraping of floor coverings over which the wheels roll.

While the foregoing has illustrated and described what is now contemplated to be the best mode of carrying out the invention, the latter is, of course, subject to modifications without departing from the spirit and scope of the invention.

Therefore, it is not desired to restrict the invention to the particular constructions illustrated and described, but to cover all modifications, that may fall within the scope of the appended claims.

I claim:

1. In a caster assembly supporting an object to be rolled, comprising:
    (a) one single caster wheel unit;
    (b) a support member, mounted in pivotal relation with the caster wheel unit and substantially accommodated within the periphery thereof, having a bore passing vertically therein, laterally offset from the axis of the caster wheel unit;
    (c) an intermediate member;
    (d) first means for pivotal mounting, laterally offset from the axis of the caster wheel unit one end of the intermediate member above and onto the support member;
    (e) second pivotal means, being laterally offset from the axis of the caster wheel unit and the first pivotal means, extending upward from the intermediate member for individual engagement with the object to be rolled.

2. In a caster assembly supporting an object to be rolled, according to claim 1, wherein the second pivotal means of the caster assembly is mounted directly into a corner section of a piece of furniture.

3. In a caster assembly supporting an object to be rolled, according to claim 1, wherein the intermediate member is a horizontally extending solid slab from which the second pivotal means extends vertically upward into the object to be rolled, for pivotal movement thereof without initially actuating the caster wheel.

* * * * *